(12) United States Patent
Bone

(10) Patent No.: US 9,814,967 B1
(45) Date of Patent: Nov. 14, 2017

(54) SYSTEM AND METHOD FOR TIME FLOW ADJUSTMENT IN MULTIPLAYER GAMES

(71) Applicant: Take-Two Interactive Software, Inc., New York, NY (US)

(72) Inventor: Jason Bone, Toronto (CA)

(73) Assignee: TAKE-TWO INTERACTIVE SOFTWARE, INC., New York, NY (US)

( * ) Notice: Subject to any disclaimer, the term of this patent is extended or adjusted under 35 U.S.C. 154(b) by 0 days.

(21) Appl. No.: 13/894,104

(22) Filed: May 14, 2013

(51) Int. Cl.
| | | |
|---|---|---|
| *A63F 13/00* | (2014.01) | |
| *A63F 13/30* | (2014.01) | |
| *A63F 13/50* | (2014.01) | |
| *A63F 13/55* | (2014.01) | |
| *A63F 13/57* | (2014.01) | |

(52) U.S. Cl.
CPC ............. *A63F 13/12* (2013.01); *A63F 13/50* (2014.09); *A63F 13/55* (2014.09); *A63F 13/57* (2014.09)

(58) Field of Classification Search
CPC .......... A63F 13/12; A63F 13/50; A63F 13/55; A63F 13/57
USPC ........................................................... 463/42
See application file for complete search history.

(56) References Cited

U.S. PATENT DOCUMENTS

| | | | | |
|---|---|---|---|---|
| 6,493,871 | B1* | 12/2002 | McGuire et al. | ............. 717/173 |
| 2003/0190951 | A1* | 10/2003 | Matsumoto | ............. A63F 13/10 463/30 |
| 2006/0287106 | A1* | 12/2006 | Jensen | ............. 463/42 |
| 2007/0099702 | A1* | 5/2007 | Tupper | ............. 463/42 |
| 2007/0265045 | A1* | 11/2007 | Takai | ............. A63F 13/10 463/8 |

OTHER PUBLICATIONS

Starcraft Wiki, "Mothership/Development", Mar. 12, 2012, retrieved from Internet on Apr. 5, 2015 from URL <http://web.archive.org/web/20120312120138/http://starcraft.wikia.com/wiki/Mothership/Development>.*
Video Moments, "Protoss Mothership (Starcraft 2)", May 22, 2007, YouTube, retrieved from Internet on Apr. 5, 2015 from URL <https://www.youtube.com/watch?v=cFH9gG0NQBo>.*
Totilo, Stephen, "How Multiplayer Bullet Time Works in Max Payne 3", published May 4, 2012 by Kotaku and retrieved from Internet on May 16, 2016 from URL< http://kotaku.com/5907699/how-multiplayer-bullet-time-works-in-max-payne-3>.*

* cited by examiner

Primary Examiner — Dmitry Suhol
Assistant Examiner — Ryan Hsu
(74) Attorney, Agent, or Firm — Orrick, Herrington & Sutcliffe LLP

(57) ABSTRACT

Innovative systems and methods are disclosed for adjusting the perceived flow of time in a multiplayer videogame system. A game mechanism is provided to slow the perceived flow of time for an initiator player, players in the line of site of the initiator, players seeing any other players in an altered time mode and players seen by players in an altered time mode. Meanwhile, other players not fitting these criteria continue to experience a normal perceived flow of time. This permits the use of the time slowing mechanic without negatively affecting all players in the multiplayer game.

12 Claims, 8 Drawing Sheets

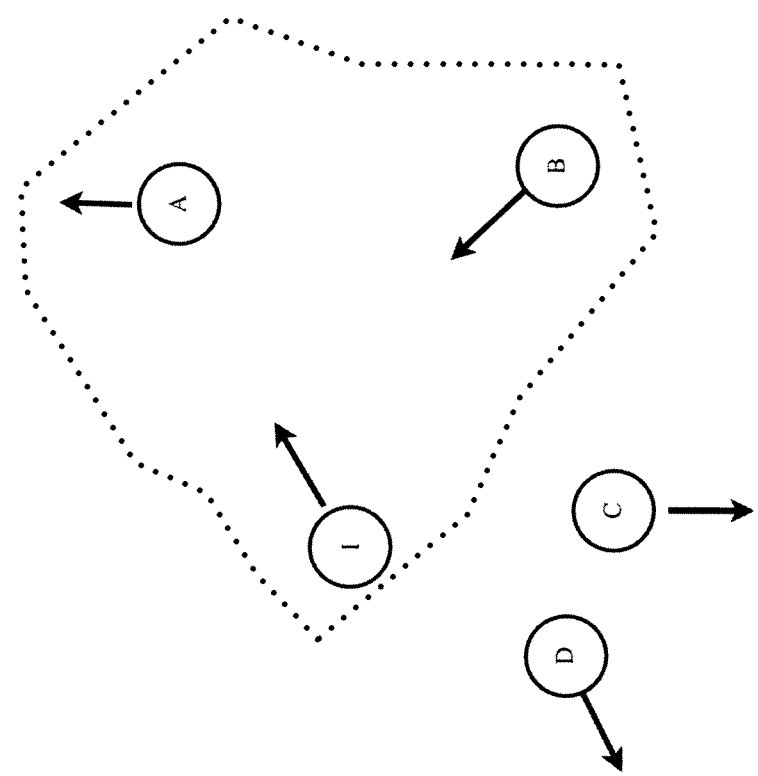

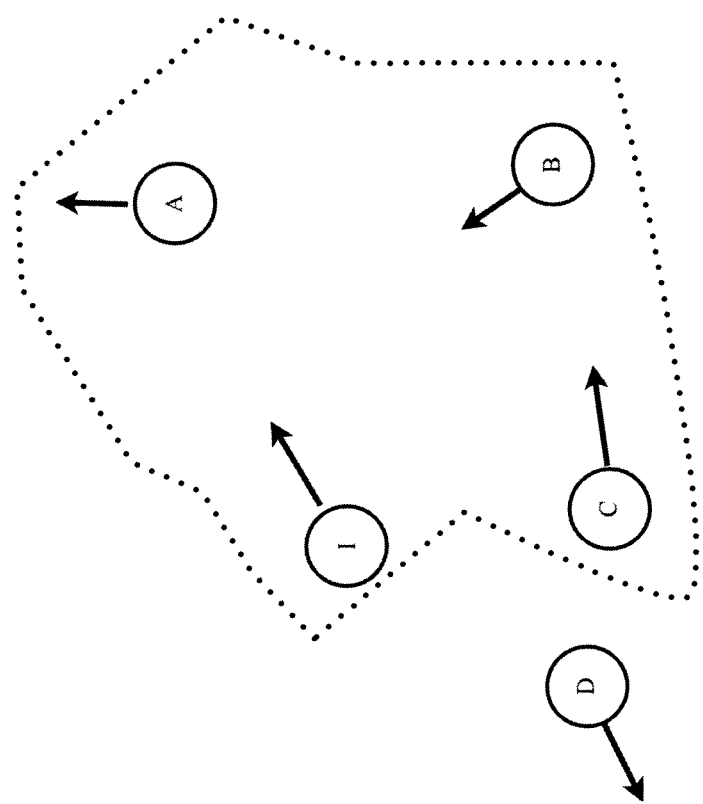

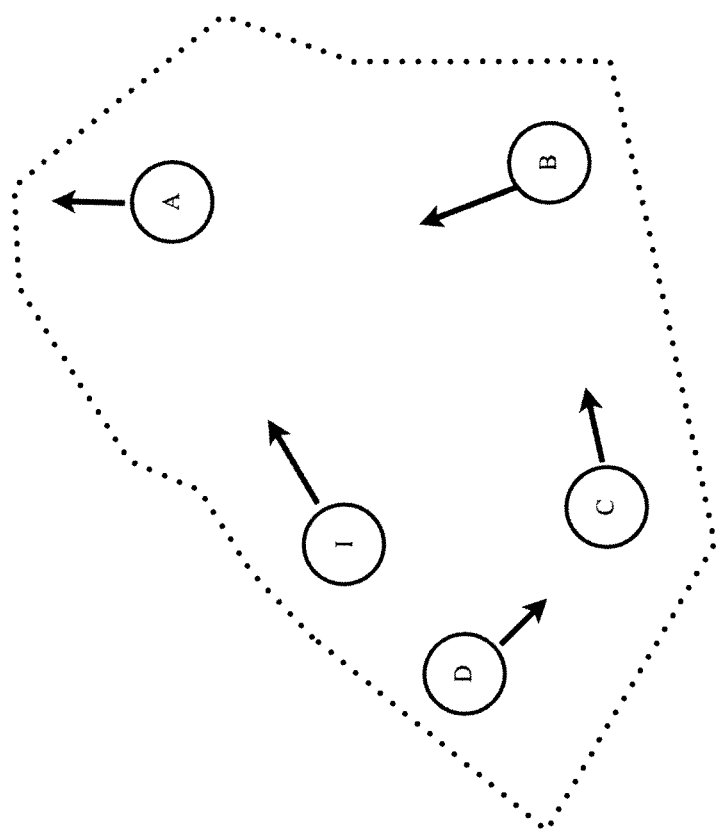

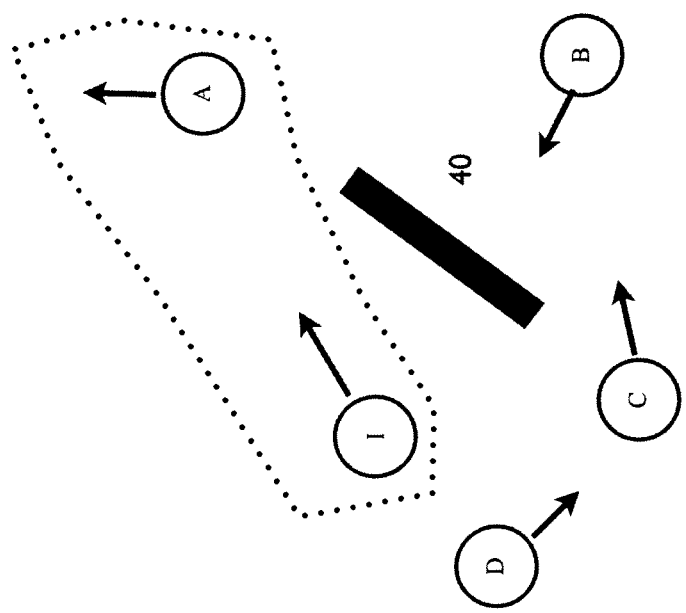

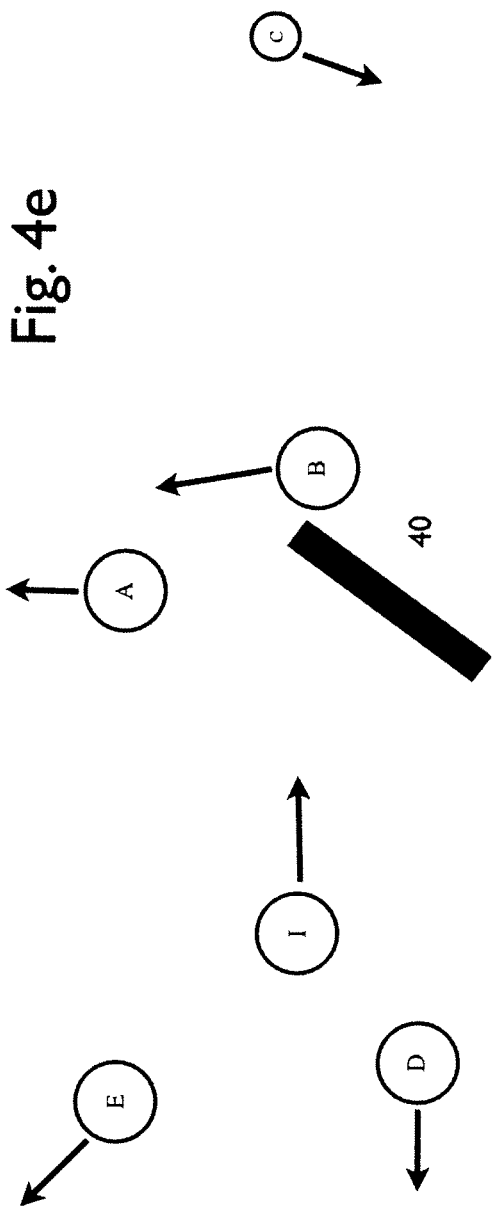

SYSTEM AND METHOD FOR TIME FLOW ADJUSTMENT IN MULTIPLAYER GAMES

CROSS REFERENCE TO RELATED APPLICATIONS

This application is submitted concurrently with commonly assigned application Ser. No. 13/894,112, entitled "System and Method for Online Community Management," Ser. No. 13/894,109, entitled, "System and Method for Multiplayer Network Gaming," and Ser. No. 13/894,099, entitled, "System and Method for Network Gaming Architecture," which are incorporated herein by reference.

FIELD OF THE INVENTION

The present disclosure generally relates to video games having a game mechanic that allows a player to adjust the perceived flow of time in the game. More specifically, systems, methods and computer program products are disclosed for accommodating time flow adjustment mechanisms in a multiplayer game environment.

BACKGROUND OF THE INVENTION

Video games often include an element of hand eye coordination where success or failure on a given task is determined by the player's ability to recognize an objective an execute an appropriate maneuver in an allotted amount of time. For example, in a simulated skeet shooting game a player must observe a target, aim and shoot before the target disappears from view. As another example, a player in a simulated tennis game must recognize the trajectory of the opposing player's shot, determine if it will land in or out of bounds, move to the ball and time a return stroke to return the ball to the desired location of the court. In other games a player might need to avoid on coming objects, jump on moving platforms, execute operations in synchronicity with music, or perform any number of time-constrained tasks.

It has been recognized in the art that player enjoyment can be enhanced by including a game feature that allows occasional relief from the time pressures of rapidly occurring game events, thereby making it easier for the player to accomplish game maneuvers. One way of doing this is to slow game timing while allowing the player to continue to react in real time. Thus, the events of the game appear to unfold in slow motion making it easier for the player to react to the game events. This enhanced game mode can be triggered by the game randomly, in pre-determined circumstances, or the player can be given the power to invoke this game mode under whatever restrictions the game designer allows.

SUMMARY OF THE INVENTION

This above described time slowing game mechanism faces problems when applied to multiplayer games. These problems are most easily seen in the context of multiplayer games involving players inhabiting a common game space, but not necessarily directly interacting with one another.

For example, a common form of multiplayer game involves a number of players each controlling an individual game character in a 3D virtual game world. The players typically have their own personal view on the 3D world by accessing the multiplayer game via their own game system (e.g., a PC, mobile device, or console) or because a shared screen is divided in a split screen mode to show individual views to multiple players. In these games the players have objectives that do not require them to be constantly engaged with, or even in the virtual presence of, the other players. Indeed, these multiplayer virtual worlds might contain tens, hundreds or thousands of players all in the same virtual world each pursuing their own game objective.

If the time flow of the entire game environment slowed every time any one of the multiple players engaged the time slowing game mechanic it would likely seriously disrupt the game play of all the players not engaged with that player. A player on the other side of the virtual world would be jarringly thrown into slow motion play without knowing by whom or why. Furthermore, as the number of participants in the world grows time slowing events would occur with greater frequency completely disrupting game play.

On the other hand, slowing time for only one of the multitude of players also would not work. Some players will often be near to, or engaging with, the player invoking the time slowing mechanism. If such players are not also slowed by the time slowing function there will be an irreconcilable discontinuity between what the various players are experiencing. Moreover, if the player that engaged the time slowing function is directly competing with another player on a particular task there will be no benefit to engaging the time slowing operation if the competitor is not slowed. For example, if players are engaged in combat with one another, the player who engaged the time slowing would actually be at a disadvantage compared to other players if the that player alone was placed into slow motion.

The presently disclosed system solves the above-described problems through computer programmable systems and methods that enable the use of time slowing functions in multiplayer environments. For ease of discussion, the player responsible for initiating the slow time mode will be referred to as the initiator. The game circumstances that result in the initiation of slow time mode are left to the choice of the game designer. For example, slow time mode could be implemented so that it occurs at the player's option, under certain game conditions, or even randomly.

Pursuant to the disclosed system, the initiator represents level 0 of a slow time mode network. When the time slowing mechanism is engaged for the initiator, any game character in the initiator's field of view also enters slowed time mode and any players having the initiator in their field of view also enter slowed time mode. These players represent level 1 of the slow time mode network because they entered time slowed mode because of a direct relationship with the initiator. Field of view here refers broadly to players within the ambit of each other's perception in the context of the game. This is most typically anything that is displayed on the screen for viewing by the human player. While this is often the game character's current environment in a 3D virtual space, it could in appropriate circumstances also include game characters that are shown on an in-game radar display, map or other contrivance that in the context of the game displays to the human player events beyond the game character's immediate surrounding.

The slowed time mode is not limited only to the level 1 players. Any players in the field of view of the level 1 players or who have the level 1 players in their field of view, collectively level 2 players, are also placed slow time mode. The network of players in slow time mode can continue to further similarly defined levels until the network naturally terminates because no further players are seeing or being seen by a player in slow time mode. Alternatively, the game implementer could choose to terminate the chain after a certain number of levels or based on some other metric, like the distance from the initiator.

In a further embodiment the implementation of slow time mode is adjusted based on the distance from the initiator to reduce the impact of the effect on players far removed from the initiating player. The embodiments discussed above where the effect of slow time mode is strictly limited to a certain number of levels or a given distance suffer from some limitations. For example, if application of slow time mode is limited to an arbitrary number of levels there is the possibility in some game environments that other players will still see game characters in the last level that is impacted by the slow time mode. In other words, if a system specified that slow time mode only extended to level 3, there may still exist players that see or are being seen by those level 3 players, i.e., potential level 4 players. This would create a discontinuity for the level 3 and potential level 4 players. A similar effect could occur if the decision to place a player in slow time mode was based solely on an arbitrary distance from the initiator.

Rather than providing a simple level or distance based cut off for slow time mode, it is advantageous to adjust the effect of the slow time mode based on the distance or level from the initiator. In this way, a player that is far from the initiator will experience less time slow down. For example, if time slows by a factor of 10 for the initiator (i.e., events are perceived as taking 10 times longer than they normally would), time might only slow by a factor of 2 or less for a player that is very far away. Preferably, the extent of the time slowing adjustment will vary with distance or level. For example, a game character that is within 10 meters of the initiator might experience the full amount of time slow down, while a game character that is between 10 and 20 meters experiences half the amount and a character that is over 20 meters experiences a quarter of the amount. In this way a gradual transition of reduced time slow down occurs so that far away players are not fully disrupted by the time slowing event, but they also are not operating at a dramatically different speed than near by players.

In a further embodiment of the disclosed system the various players in the multiplayer environment can be grouped into teams. In such an embodiment, the beneficial effects of time slow down can be, at the option of the implementer, applied to the initiator and any team members of the initiator that are encompassed by the slow time mode network.

While the previous discussions about time slowing have focused on the effect of the slow time mode on other players, it should be apparent that the time slowing will also impact non-player objects in the game. In order to gain the benefit of slow time mode non-player game elements, such as projectiles, vehicles, computer controlled characters, and moving platforms, will also need to slow down. In that regard, the decision of which non-player objects to slow down can be determined in a manner similar to that described with respect to players, although the system obviously only needs be concerned with the players that see these objects and not what the non-player objects see.

In one advantageous embodiment a method is provided for creating varied time experience in a multiplayer video game. The method initiates time varied mode for the benefit of an advantaged player; generates a time variation network representing a plurality of players in time varied mode, wherein the network comprises the advantaged player and players seen by the advantaged player, and players seeing the advantaged player; slows a game clock to a first slowed rate; executes one or more actions performed by players in the time variation network at the first slowed rate; executes one or more actions performed by the advantaged player at a rate greater than the first slowed rate; accelerates the actions of players outside the time variation network that are dependent on the game clock by an amount required to counteract the slowing of the game clock. In a further embodiment the time variation network is a record specifying the players in time variation mode. In a further embodiment the time variation network is accomplished by the transmission of messages to the effected players. In a further embodiment the time variation network includes any players that see another player in the time variation network. In a further embodiment the time variation network includes any players seen by a player in the time variation network. In a further embodiment the time variation network further includes any players that see or are seen by another player in the time variation network. In a further embodiment when a player exits the time variation network when they no longer see or are seen by any players in the time variation network. In a further embodiment the execution of actions by one or more players in the time variation network are accelerated relative the first slowed rate by a factor dependent on a distance from the advantaged player. In a further embodiment a moving action and an aiming action of the advantaged player are accelerated at different rates. In a further embodiment players in the time variation network that are teammates of the advantaged player have actions accelerated compared as compared to players that are not teammates. In a further embodiment computer code for practicing the above methods is provided a nonvolatile computer readable medium and includes processor executable instructions for performing the various above described steps.

In another embodiment a video game system for providing varied time experience in a multiplayer game includes a processor and a memory in communication with the processor and a user input interface connected to the processor (such as a game controller, touch screen or the like); a network interface (such a wireless Internet connection) is connected with the processor to provide communication with other game systems; instructions stored in the memory and executable by the processor are provided to receive input from the user input interface and in response initiate time varied mode for the benefit of an advantaged player; transmit over the network interface the imitation of the time varied mode; generate a time variation network representing a plurality of players in time varied mode, wherein the time variation network comprises the advantaged player and players seen by the advantaged player, and players seeing the advantaged player; transmit over the network interface information specifying players seen by the advantaged player; receive over the network interface information specifying players that see the advantaged player; slow a game clock to a first slowed rate; execute one or more actions performed by players in the time variation network at the first slowed rate; execute one or more actions performed by the advantaged player at a rate greater than the first slowed rate; accelerate the actions of players outside the time variation network that are dependent on the game clock by an amount required to counteract the slowing of the game clock.

BRIEF DESCRIPTION OF THE DRAWINGS

The accompanying drawings illustrate various non-limiting, inventive aspects in accordance with the present disclosure:

FIG. 4a-e show illustrative examples players in slow time mode.

DETAILED DESCRIPTION OF THE INVENTION

In the following description of the various embodiments, reference is made to the accompanying drawings, which show by way of illustration various exemplary embodiments that practice the disclosed invention. It is to be understood that other embodiments may be utilized and structural and functional modifications may be made without departing from the scope of the present invention.

Figure 1:
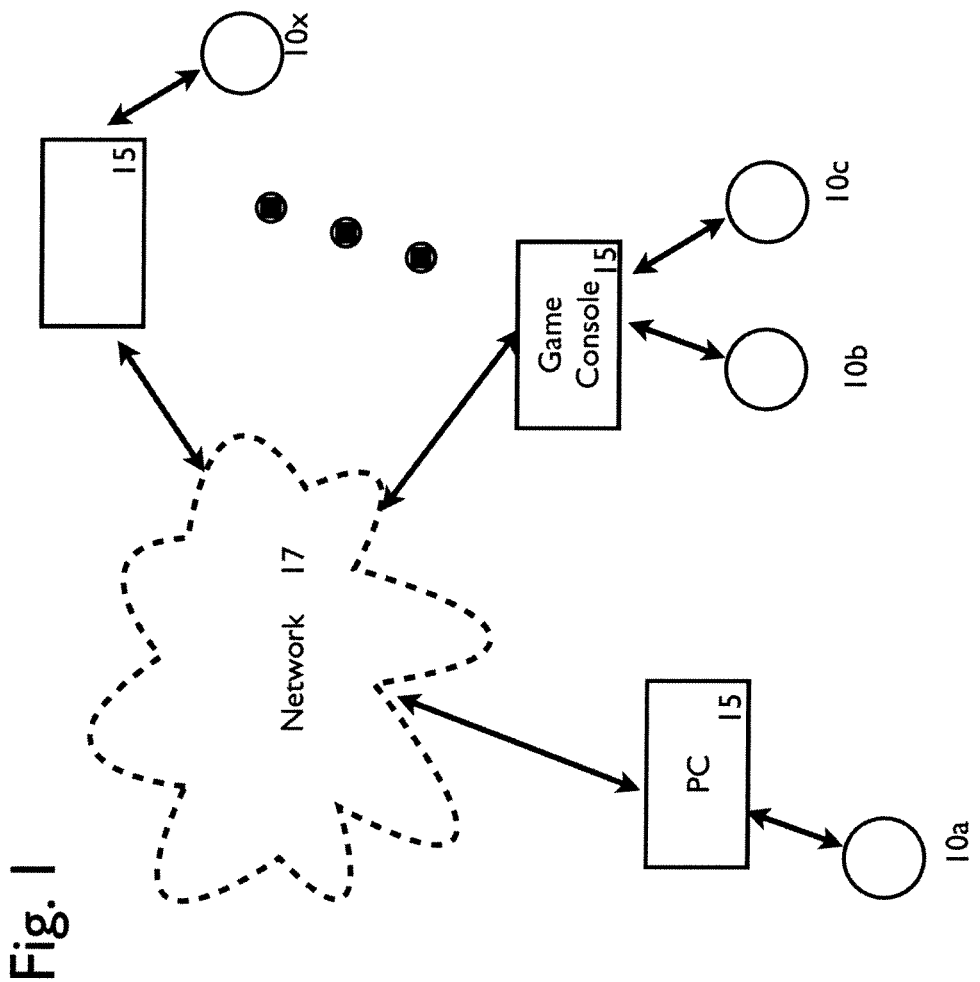
FIG. 1 shows an overview of an exemplary system in accordance with disclosed systems.

FIG. 1 shows an exemplary multiplayer gaming system suitable for describing the present multiplayer time flow adjustment system. Multiple players 10a-x participate in a combined multiplayer game. The players access the game through a gaming system, such as a personal computer, dedicated gaming console, arcade gaming unit, mobile gaming device, mobile device or other suitable computing environment, which are in communication with one another to play a game. Each of these gaming systems provides the players a view on the virtual game environment. In some cases, a game system might provide multiple views on the virtual game environment for two or more players through a split screen, multiple screens or some other mechanism. Through this hardware the players each control game characters in the virtual game environment. The game is embodied in gaming code running on the gaming system, networked computers, or some combination thereof.

Figure 2A:
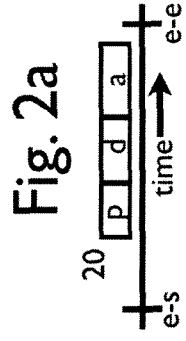
FIGS. 2a-c show illustrative timing examples.
Figure 2B:
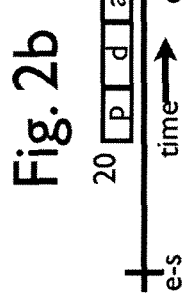
Figure 2C:
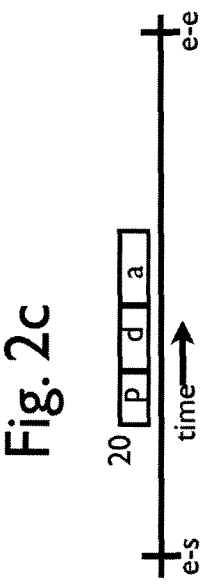

FIGS. 2a-c demonstrate the basic concept of a time slowing game mechanic. FIG. 2a shows the basic timing of a successful event for a video game. The event has a start e-s and an end e-e with some time in between the start and the end. The event in this context is anything that requires the player to react within some limited period. The bar 20 shows the player's reaction to the event. The player perceives the event 20p, the player decides a course of action 20d and the player takes some action 20a. While these different parts are shown serially for the sake of simplicity, they often may overlap in varying degrees. Ultimately, if the player takes the proper action before the event end, the player succeeds in its task. Applying this to a concrete example, assume the game play for the game at issue involves enemy characters that try to kill the player's character and teammate characters that are on the same side as the player. The event start might be involve the player coming into the vicinity of another character. The player must see the other character 20p, decide if the character is friend or foe 20d, and, if the character is an enemy, manipulate the game's user interface to attack and defeat the enemy 20a. FIG. 2a shows the successful accomplishment of such an event. In contrast, FIG. 2b shows the actions of a player that did not have enough time to successfully accomplish the game event. Here the player took a long time before it perceived the other character. This did not leave it enough time to decide and act on the event before the event end e-e. Here the event might be the enemy character defeating the player. Here the extra time needed, but unavailable is shown by cross-hatching.

FIG. 2c shows the advantage of using slow time mode in the context of the FIG. 2b event. By engaging slow time mode, the actions of the video game are slowed to less than real time. For example, if game time were slowed to half real time, the events in the game would look like they are occurring in slow motion such that things take twice the amount of time they normally would. Thus, the time between the start of the event e-s and the end of the event e-e is extended. Because the game events are slowed the player now has enough time to defeat the enemy.

Figure 3A:
FIG. 3a-b show illustrative timing for multiplayer systems

FIG. 3a shows the interaction of two players in a multiplayer game environment. Because the game characters in this scenario are both controlled by human players, there is not a strict event start and end. Instead, the engagement starts when the two players come into contact with one another. In this example player 31 clearly has the advantage in reaction time over player 32. In particular, player 32 appears to be slower to sight and identify the required actions compared to player 31. Thus, at normal game speed, player 31 completes the required actions first, e.g., sight, identify and target, and defeats player 32.

Figure 3B:
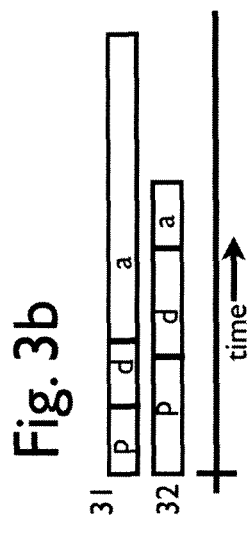

If, however, player 32 engages slowed time mode, the engagement will play out as shown in FIG. 3b. Here time has slowed. And, because player 32 engaged the slowed time mode, the in-game character controlled by player 31 is disadvantaged and slowed with the game. Even though player 31 has fast reaction time and can sight and identify what needs to be done as quickly as before, the game character controlled by player 31 is limited to acting out the controlled instructions in slow motion. For example, the system might only accept input from the player at a slower rate commensurate with the slowed time. Or the player's inputs could be ignored completely. In a preferred embodiment, a player's inputs are filtered based on the timing of the in-game character's animation. This filtering is then extended in accordance with the slowed animation of the slowed time mode. In contrast, player 31 has the advantage of having the game system react to the control of his player in real time.

The display of the difference in reaction time between the party advantaged by slow time mode and the player disadvantaged by slow time mode can be embodied in a number of different ways. For example, the character controlled by the time slow advantaged player could continue to move at the same, real time, speed as the player's inputs. This, however, would make the advantaged player's in-game character appear to move with at unnaturally quick pace in the context of the game. This could be useful to implement a character with a "super power" that allows it to move at faster than other players. If, however, the game implementer does not want the game characters to appear to have unnatural speed, this approach may not be desirable. In that alternative, the game control inputs for the advantaged player can be collected in real time but the in-game character would move at the slowed pace. This still provides an advantage, however, because it gives the player ample time to execute the correct in game movements. A hybrid approach could also be employed. For example, certain aspects of the game's user interface, like aiming and firing, could be done in real time, while other aspects of the game like the character's dodging and running speed remain slow motion. This would be advantageous because the advantaged player's targeting and aiming user interface can only appear on the player's viewing screen for the game, giving them beneficial feedback to take advantage of the slowed time mode. But the large moments of the advantaged player's in-game character that are seen by other players remain realistically slowed.

FIG. 4a demonstrates the determination of which players experience slowed time mode and which do not. The figure depicts a birds eye view of in-game character positions in order to demonstrate the innovative aspects of the present disclosure. But the figure assumes that the game would be operating in a first or third person view. Accordingly, the circles show in-game characters each controlled by a player participating in the multiplayer game. The arrows show the direction the character is looking, or more specifically the direction shown to the players in their user interfaces for the game. The initiator of slow time mode, player I, is looking at player A. Player A is, therefore, placed into slow time mode. If player I is trying to attack player A, player I would now have the advantage of having more time to maneuver the controls to execute a successful attack on player A. Meanwhile, player B is looking at player I. Player B is, therefore, also placed in to slow time mode. Player B, however, is not given the benefits of increase reaction time because player B is not the initiator. Players C and D are not seen by, nor do they see, players I, A or B. Accordingly, players C and D are not placed in to slow time mode. The dotted line depicts the players that experience slow time mode.

FIG. 4b demonstrates another example determination of players in slow time mode. Here players I, A and B are oriented as they were in FIG. 4a and are all in slow time play mode for the reasons discussed above. Player C, however, has turned its field of view towards player B thereby placing player C in slow time mode as shown by the dotted line. Player D is still neither sees any of the slow time mode players nor is D seen by any of those players. Accordingly, player D remains outside of slow time mode and continues to perceive in-game time flowing at the normal rate. In some embodiments, the determination of players in and out of slow time mode can change during the slow time mode event. For example, if the arrangement of players in FIG. 4b progressed from the arrangement shown in FIG. 4a, player C could have been placed in slow time mode by turning such that player B came into player C's field of view. This same approach could, optionally, be used to allow players out of slow time mode when they look away from the effected players.

FIG. 4b shows three levels of slow time mode. The initiator is level 0. Players A and B are at level 1 because they either see player I, e.g., player B, or are being seen by player I, e.g., player A. Player C is at level 2 of the slow time mode network because player C is in slow time mode by virtue of seeing a player at level 1 of the slow time mode, e.g., player B. Considering the players in these levels demonstrates an effective coding mechanism for implementing slow time mode. Using a graph based coding structure to represent the players in slow time mode, allows players to be released from slow time mode when the node that connects them to slow time mode is released.

Players are tracked in-game via a synced visibility matrix. Each player locally performs line-of-sight probes to other players to determine if the other players are visible and creates a list of which players are currently visible to them. In a third-person game the visibility probes would include both the in-game character's position and the camera view). This process could require a large number of calculations. For example, in a third-person game involving 16 players, 480 visibility determinations must be made (each of the 16 players must determine the visibility of 15 other players in two views, 16×15×2=480). In order to limit the burden of performing all of these calculations on each of the players machines, each machine can perform a subset of the calculations and submit its results to a list that is synchronized in a distributed fashion with the other players in the game. Other mechanisms besides line of sight probes could be used to determine visibility checks. For example, the same visibility lists could be based on occlusion tests, 3D volume, or other methods pertinent to the game implemented to use the system.

FIG. 4c demonstrates another example determination of players in slow time mode. This arrangement of players is similar to the arrangement of FIG. 4b, but player D has now turned so that he sees player C. Accordingly, all of the players in the figure are now in slow time mode. Player D, however, is at level 3 of the slow time mode network. Player D's presence in slow time mode depends upon the initiator (level 0), player B (level 1), and player C (level 2). Player D would exit slow time mode if anyone at a lower level exited slow time mode. For example, if player B looked away from the initiator, player D's chain to the initiator would be broken and slow time mode would end.

FIG. 4d demonstrates a further example determination of players in slow time mode. As shown a barrier between player B and the initiator prevents player B from seeing the initiator and being placed in slow time mode. Accordingly, players C and D are not placed in slow time mode as they were in FIG. 4c. Because players B, C and D do not see any players in slow time mode there is no discontinuity of their game play if they remain in normal time mode.

Visual discontinuity between players inside and outside slow time mode is a consideration when making a decision whether or not to place a player in slow time mode. Accordingly, the game designer may choose to base the decision on whether or not to place a player in slow time mode based on considerations relating to the relative visibility of the other players. For example, player B in FIG. 4e is within the line of sight of the initiator, but is mostly obscured by a barrio. If only a small piece of player B's in-game character is visible to the initiator there is little risk of a visible discontinuity. Similarly, player C is in the initiator's line of sight, but is relatively far away (depicted schematically as a smaller circle). If the player C is so far away that it only takes up a very small, e.g. negligible, portion of the initiator's field of view there is also a smaller risk of discontinuity. If the game implementer deems these potential discontinuities to be negligible, it can set a threshold for judging whether the in view conditions met. For example, if the other player only appears on a very small fraction of the screen it can be deemed effectively not visible and the player can be left out of slow time mode.

Figure 5:
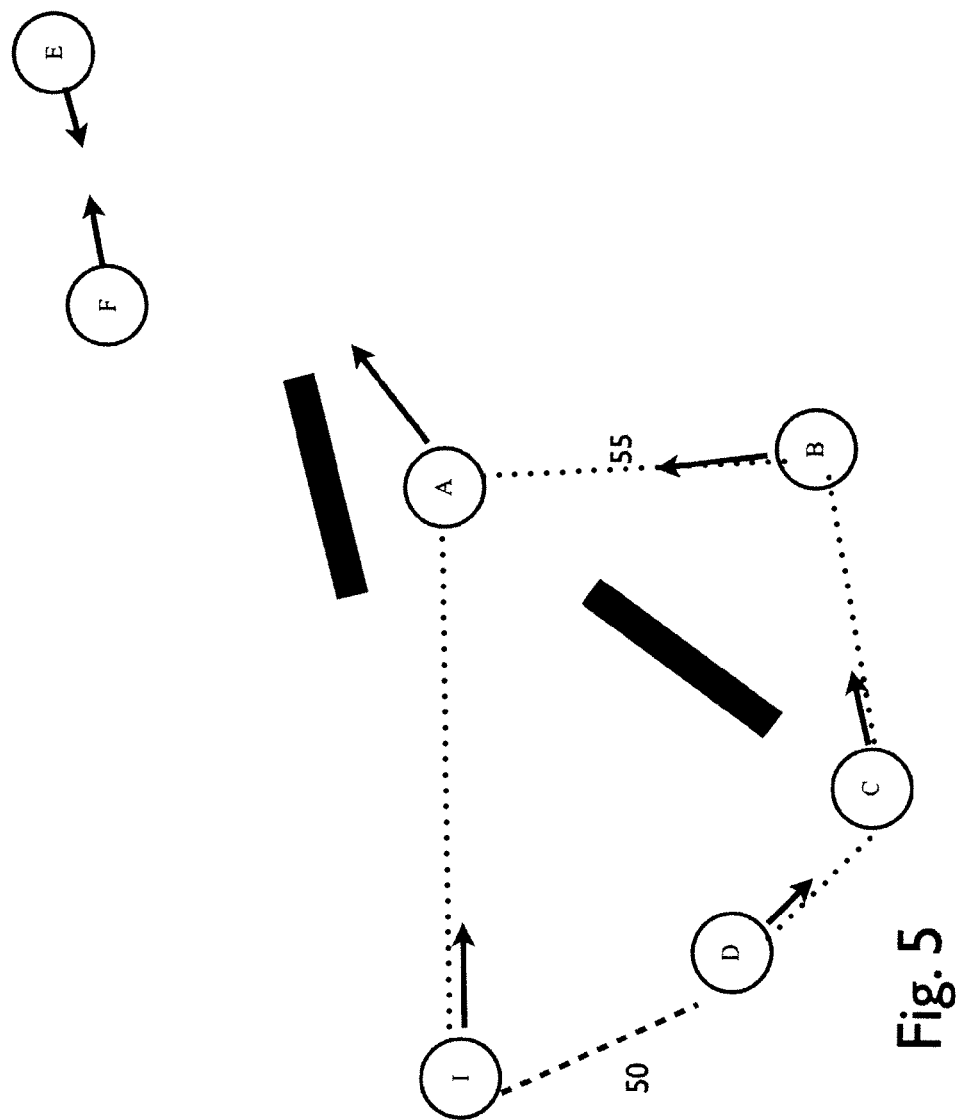
FIG. 5 show illustrative use of distance measurements to effect slow time mode.

The need for a visibility threshold may be mitigated, and other advantages provided, by altering the impact of the slow time mode based on distance criteria. If a player is truly far away such that they are not very visible to the other affected players, the slow time mode is likely to have a limited effect on them. Thus, there is less of a negative trade off to having them included in the time slowing mode. The criteria for distance can be measured in a number of different ways. The impact of the slow time mode can be based on a straight-line distance from the initiator, see the dashed line 50 in FIG. 5. Or, the distance can be based on the straight-line distance from the player that caused the player to be slowed to be placed into slow time mode. Alternately, the distance can be measured based on the line of sight distance from the initiator, see series of dotted lines 55 of FIG. 5. The significant differences between these two approaches are shown in FIG. 5. As shown, player D is close to the initiator in real physical terms, but is only subject to time slow mode due to a long and circuitous path. A designer can choose to base its time slowing function on whichever of these two paths best accomplishes the designer's game play intent. As a further alternative the time slowing effect can change so that it is reduced at each level of the time slow mode network, e.g., the effect is reduced by 10% for each additional level.

The following table shows pseudo code for an advantageous embodiment for determining slowed time effect fall-off by distance from the initiator.

Table: Effect Fall-Off by Distance
Comments:
// DistanceFromSource—distance from initator to player we need to calculate fall-off for
// GameTimeStep—game simulation time step
// MaxDistance—maximum slowed time distance at this distance the effect disappears completely
// DistanceDecayRate—distance decay rate of the effect
// CurrentSaturation—calculated saturation for affected player, always in range [0 . . . 1] (0—no effect, 1—maximum effect)
Code:
CurrentDistance=DistanceFromSource−GameTimeStep*DistanceDecayRate
if(CurrentDistance<0) then
   CurrentDistance=0
end
DesiredSaturation=(MaxDistance−DistanceFromSource)/MaxDistance
if DesiredSaturation<0 then
   DesiredSaturation=0
else if DesiredSaturation>1 then
   DesiredSaturation=1
end
float delta=DesiredSaturation−CurrentSaturation;
if(delta>=0) then
   delta*=SaturationSmoothingRate^GameTimeStep;   // takes
   SaturationSmoothingRate into power of GameTimeStep//
   CurrentSaturation=DesiredSaturation−delta;
End A further advantageous embodiment is provided by gradually ramping up the time slowing effect as a player enters slowed time mode and ramping down the effect as a player exits slowed time mode. This avoids the jarring effect of abrupt changes to the player's experience of time flow. This also avoids a stuttering effect if another player's line of sight state is changing rapidly. This can be accomplished by having the slowed time effect engaged via an interpolation from one time rate to another.

As discussed with reference to FIG. 1, the multiplayer game system typically involves a number of player computing devices communicating over a network. The shared virtual world accessed by these various computing devices requires a common clock to execute and synchronize the various events in the world. The operation of this world clock, however, is complicated where different entities present in the world are experiencing the flow of time at different rates. For example, when two players meet in the virtual world their systems must record the same time, despite the fact that one of the players might have previously experienced a time slowing event.

This is particularly true in a multiplayer game environment where the game is operated in a distributed environment. In a distributed gaming environment, each of the player's computing device runs code executing a local copy of the shared virtual world. The multiple copies of the "shared" virtual world are kept consistent and synchronized by passing messages over the network describing the actions of the various players. These event messages include a virtual world time for synchronization purposes.

In an advantageous embodiment, the synchronization of the various world events occurring at different perceived time rates is maintained by slowing the world clock to the rate of the slowed time mode. Using FIG. 4a for illustrative purposes, if the initiator engages slow time mode, players I, A and B are intended to experience the slow motion effect. If the time slowing effect implements slowing by a factor of 10, players I, A and B should see actions that normally take one second stretch out to take 10 seconds. Slowing the world clock used by the games physics engine to one $10^{th}$ its normal rate will accomplish this. Note that while the world clock that describes the game entities motion through the virtual space is slowed, games display frame rate maintains its normal refresh pace. Thus, the characters appear to move in slow motion, rather than the game merely looking choppy.

Of course, if nothing else were done, all game entities would move in slow motion including players C and D, who were not intended to be impacted by slow time mode. Accordingly, to maintain the appearance of "normal" speed for these players, all their movements must be speed up by a factor of 10. For example, if player D's in game character was moving at 1 meter second prior to engagement of slow time mode, it must move at 10 meters second while in slow time mode.

In a further advantageous embodiment, the players in the multiplayer game can be organized into teams of cooperating players. When teams are provided the game implementer can decide to give teammates of the initiator the advantage of slow time mode when they are placed into slow time network created by the initiator. In other words, the initiator's teammates will be able to react like the initiator, rather than being slowed like the competitors.

In another embodiment, the speed of different game elements can be separately controlled to provide an optimized in game effect. As discussed above with respect to the adjustment of time slowing based on distance, time slowing can also be done on a game element by game element basis. For example, in a shooting game improved slowing enemy characters to a near standstill might be advisable so that they barely move and present easy targets. But, if dodging bullets or other projectiles is an intended part of the game play, slowing everything down to a near standstill will remove the dodging element from game play. To accommodate both of the above elements in slow time mode, the bullets or other projectiles can be sped up by an appropriate factor as was described above with respect to players far away from the slow time initiator. Movement of the initiator can also be sped up to allow dodging to occur. These varied speeds can also be structured to apply different factors to different elements of a in-game character's capabilities. For example, a player might be able to aim, shoot, look and run all at separate speeds to embody the game play desired by the developer. This flexibility can similarly be applied to give the initiator's teammates somewhat less than the full advantage of the imitator.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A method for managing irreconcilable timing discontinuities when providing varied time experience in a multiplayer video game on a computerized system having a processor comprising:
   initiating time varied mode for the benefit of an advantaged player;
   generating a synced visibility matrix representing a plurality of players in the time varied mode, said generating being based on the advantaged player and players seen by the advantaged player, and any player seeing the advantaged player;
   initiating a time variation network defined by said generated synced visibility matrix;
   slowing a game clock to a first slowed rate;
   executing one or more actions performed by the plurality of players in the time variation network at the first slowed rate;
   executing one or more actions performed by the advantaged player at a rate greater than the first slowed rate; and
   accelerating the actions of players outside the time variation network that are dependent on the game clock by an amount required to counteract the slowing of the game clock,
   wherein the actions of players outside the time variation network are synchronized with the one or more actions performed in said time variation network to provide the players outside the time variation network with a normal perception of time and
   wherein a moving action and an aiming action of the advantaged player are accelerated at different rates.

2. The method of claim 1 wherein the time variation network is embodied by a record specifying the players in time variation mode.

3. The method of claim 1 wherein the time variation network is embodied by the transmission of messages to the effected players.

4. The method of claim 1 wherein the time variation network further comprises any players that see another player in the time variation network.

5. The method of claim 1 wherein the time variation network further comprises any players seen by a player in the time variation network.

6. The method of claim 1 wherein the time variation network further includes any players that see or are seen by another player in the time variation network.

7. The method of claim 6 wherein a player exits the time variation network when they no longer see or are seen by any players in the time variation network.

8. The method of claim 6 wherein the execution of actions by one or more players in the time variation network are accelerated relative the first slowed rate by a factor dependent on a distance from the advantaged player.

9. The method of claim 6 where in players in the time variation network that are teammates of the advantaged player have actions accelerated compared as compared to players that are not teammates.

10. A non-transitory computer readable medium storing processor executable instructions for managing irreconcilable timing discontinuities when providing varied time experience in a multiplayer video game comprising:
    instructions for initiating time varied mode for the benefit of an advantaged player;
    instructions for generating a synced visibility matrix representing a plurality of players in time varied mode, said instructions for generating being based on the advantaged player and players seen by the advantaged player, and any player seeing the advantaged player;
    instructions for initiating a time variation network defined by said generated synced visibility matrix;
    instructions for slowing a game clock to a first slowed rate;
    instructions for executing one or more actions performed by the plurality of players in the time variation network at the first slowed rate;
    instructions for executing one or more actions performed by the advantaged player at a rate greater than the first slowed rate; and
    instructions for accelerating the actions of players outside the time variation network that are dependent on the game clock by an amount required to counteract the slowing of the game clock,
    wherein the actions of players outside the time variation network are synchronized with the one or more actions performed in said time variation network to provide the players outside the time variation network with a normal perception of time, and wherein a moving action and an aiming action of the advantaged player are accelerated at different rates, and wherein the time variation network further includes any players that see or are seen by another player in the time variation network and the execution of actions by one or more players in the time variation network are accelerated relative the first slowed rate by a factor dependent on a distance from the advantaged player.

11. A video game system for managing irreconcilable timing discontinuities when providing varied time experience in a multiplayer game comprising:

a processor;

memory in communication with the processor;

a user input interface connected to the processor;

a network interface connected with the processor to provide communication with other game systems;

instructions stored in the memory and executable by the processor comprising:

instructions for receiving input from the user input interface and in response initiating time varied mode for the benefit of an advantaged player;

instruction for transmitting over the network interface the imitation of the time varied mode;

instructions for generating a synced visibility matrix representing a plurality of players in time varied mode, said instructions for generating being based on the advantaged player and players seen by the advantaged player, and any player seeing the advantaged player;

instructions for initiating a time variation network defined by said generated synced visibility matrix;

instructions for transmitting over the network interface information specifying players seen by the advantaged player;

instructions for receiving over the network interface information specifying players that see the advantaged player;

instructions for slowing a game clock to a first slowed rate;

instructions for executing one or more actions performed by players in the time variation network at the first slowed rate;

instructions for executing one or more actions performed by the advantaged player at a rate greater than the first slowed rate; and instructions for accelerating the actions of players outside the time variation network that are dependent on the game clock by an amount required to counteract the slowing of the game clock, wherein the actions of players outside the time variation network are synchronized with the one or more actions performed in said time variation network to provide the players outside the time variation network with a normal perception of time, and wherein a moving action and an aiming action of the advantaged player are accelerated at different rates.

12. A method for managing irreconcilable timing discontinuities when providing varied time experience in a multiplayer video game on a computerized system having a processor comprising:

initiating time varied mode for the benefit of an advantaged player;

generating a synced visibility matrix representing a plurality of players in the time varied mode, said generating being based on the advantaged player and players in a line of sight of the advantaged player, and any player having the advantaged player in their line of sight;

initiating a time variation network defined by said generated synced visibility matrix;

slowing a game clock to a first slowed rate;

executing one or more actions performed by the plurality of players in the time variation network at the first slowed rate;

executing one or more actions performed by the advantaged player at a rate greater than the first slowed rate; and accelerating the actions of players outside the time variation network that are dependent on the game clock by an amount required to counteract the slowing of the game clock, wherein the actions of players outside the time variation network are synchronized with the one or more actions performed in said time variation network to provide the players outside the time variation network with a normal perception of time, and wherein the time variation network further includes any players that see or are seen by another player in the time variation network and the execution of actions by one or more players in the time variation network are accelerated relative the first slowed rate by a factor dependent on a distance from the advantaged player.

* * * * *